United States Patent
Hofmann et al.

(10) Patent No.: US 10,558,045 B2
(45) Date of Patent: Feb. 11, 2020

(54) METHOD FOR PRODUCING AN OPTICAL ELEMENT

(71) Applicant: Carl Zeiss Smart Optics GmbH, Aalen (DE)

(72) Inventors: Jens Hofmann, Jena (DE); Gerhard Kelch, Aalen (DE); Wolf Krause, Essingen (DE); Joerg Puetz, Aalen (DE); Georg Michels, Aalen (DE)

(73) Assignee: tooz technologies GmbH, Aalen (DE)

( * ) Notice: Subject to any disclaimer, the term of this patent is extended or adjusted under 35 U.S.C. 154(b) by 2 days.

(21) Appl. No.: 15/514,514

(22) PCT Filed: Sep. 21, 2015

(86) PCT No.: PCT/EP2015/071590
§ 371 (c)(1),
(2) Date: Mar. 25, 2017

(87) PCT Pub. No.: WO2016/046125
PCT Pub. Date: Mar. 31, 2016

(65) Prior Publication Data
US 2017/0227775 A1    Aug. 10, 2017

(30) Foreign Application Priority Data
Sep. 26, 2014   (DE) .................. 10 2014 113 966

(51) Int. Cl.
*G02B 27/14*   (2006.01)
*G02B 27/01*   (2006.01)
(Continued)

(52) U.S. Cl.
CPC .... *G02B 27/0172* (2013.01); *B29D 11/00009* (2013.01); *B29D 11/00865* (2013.01);
(Continued)

(58) Field of Classification Search
CPC .............. G02B 27/0172; G02B 5/1842; G02B 2027/0125; G02B 2027/0178;
(Continued)

(56) References Cited

U.S. PATENT DOCUMENTS 6,231,183 B1    5/2001 Dillon
8,665,178 B1 *  3/2014 Wang ................. G02B 27/0172
                                                    345/7

(Continued)

FOREIGN PATENT DOCUMENTS

JP    S56501386 A    9/1981
JP    2012198264 A   10/2012
JP    2014524600 A    9/2014

OTHER PUBLICATIONS

Written Opinion rendered by the International Searching Authority for PCT/EP2015/071590, dated May 26, 2016, 18 pages (including English translation).

*Primary Examiner* — Brandi N Thomas
(74) *Attorney, Agent, or Firm* — Skaar Ulbrich Macari, P.A.

(57) ABSTRACT

A method for producing an optical element includes providing a first partial body which is transparent for the predetermined wavelength range and including on its upper side a structured section, applying a coating which is optically effective for the predetermined wavelength range onto the structured section in order to form the optically effective structure, and applying a cover layer which is transparent for the predetermined wavelength range onto the upper side of the first partial body by means of casting of thermoplastic material and/or duroplastic material.

16 Claims, 5 Drawing Sheets

(51) Int. Cl.
*G02B 1/14* (2015.01)
*B29D 11/00* (2006.01)
*G02B 1/04* (2006.01)
*F21V 8/00* (2006.01)
*G02C 11/00* (2006.01)
*B29K 75/00* (2006.01)

(52) U.S. Cl.
CPC ............... *G02B 1/041* (2013.01); *G02B 1/14* (2015.01); *G02B 6/0035* (2013.01); *G02C 11/10* (2013.01); *B29K 2075/00* (2013.01); *G02B 2027/0178* (2013.01)

(58) Field of Classification Search
CPC .......... G02B 5/1861; G02B 2027/0116; G02B 2027/0145; G02B 2027/0174; G02B 27/0081; G02B 27/1086; G02B 27/4211; G02B 27/4266
USPC ......... 359/619–633, 811, 815, 813, 819–822
See application file for complete search history.

(56) References Cited

U.S. PATENT DOCUMENTS

| | | |
|---|---|---|
| 2006/0192306 A1 | 8/2006 | Giller et al. |
| 2007/0132123 A1 | 6/2007 | Koscher et al. |
| 2009/0122414 A1 | 5/2009 | Amitai |
| 2009/0147363 A1 | 6/2009 | Murata et al. |
| 2010/0011637 A1* | 1/2010 | Zhang ............... G09F 7/10 40/442 |
| 2012/0014638 A1* | 1/2012 | Fujii ............... G01D 5/342 385/12 |
| 2012/0086623 A1 | 4/2012 | Takagi et al. |
| 2012/0300311 A1 | 11/2012 | Simmonds et al. |
| 2013/0120707 A1 | 5/2013 | Shan et al. |
| 2014/0043850 A1* | 2/2014 | Thompson ........... G02B 6/0035 362/607 |
| 2015/0205138 A1* | 7/2015 | Dobschal ........... G02B 27/0172 359/572 |

* cited by examiner

Fig. 13 ated image of such that the user can perceive it as a virtual image.

METHOD FOR PRODUCING AN OPTICAL ELEMENT

PRIORITY

This application claims the benefit of German Patent Application No. 102014113966.6 filed on Sep. 26, 2014, which is hereby incorporated herein by reference in its entirety.

FIELD

The present invention relates to a method for producing an optical element which comprises a body that is transparent for a predetermined wavelength range, in which an optically effective structure is embedded.

BACKGROUND

Optical elements can be used e.g. as spectacle lens for a display device that can be fitted on the head of a user and generate an image, wherein the optical element can be part of an imaging optical system of the display device and the imaging optical system, when the display device is fitted on the user's head, images the generated image such that the user can perceive it as a virtual image.

There is increasingly a need to be able to produce such an optical element with a buried optically effective structure in large quantities and with high accuracy.

SUMMARY

An object of the invention includes providing a method for producing an optical element which comprises a transparent body, in which an optically effective structure is embedded, which method makes possible production of the optical element with high quality in large quantities.

The disclosure includes a method for producing an optical element which comprises a body that is transparent for a predetermined wavelength range, in which an optically effective structure is embedded, which method comprises:
a) providing a first partial body which is transparent for the predetermined wavelength range and comprises on its upper side a structured section,
b) applying a coating which is optically effective for the predetermined wavelength range onto the structured section in order to form the optically effective structure, and
c) applying a protective layer which is transparent for the predetermined wavelength range onto the upper side of the first partial body by means of casting thermoplastic material and/or thermosetting material.

The first polymer material and the second polymer material can, in each case, be a thermoplastic material and/or a duroplastic material. As thermoplastic material can be used, e.g., PMMA (polymethyl methacrylate, e.g. Plexiglas), PA (polyamides, e.g. Trogamid CX), COP (cyclo olefin polymers, e.g. Zeonex), PC (polycarbonate, poly(bisphenol A carbonate), e.g. Makrolon), LSR (Liquid Silicone Rubber, e.g. Silopren, Elastosil), PSU (polysulfone, e.g. Ultrason), PES (polyethersulfone) and/or PAS (poly(arylene sulfone)). As duroplastic material can be used, e.g., ADC (allyl diglycol carbonate, e.g. CR-39), acrylates (e.g. Spectralite), PUR (polyurethanes, e.g. RAVolution), PU/PUR (polyureas, polyurethanes, e.g. Trivex), PTU (polythiourethanes, e.g. MR-8, MR-7) and/or polymers on episulfide/polythiol basis (e.g. MR-174).

The optically effective structure can be completely embedded in the transparent body such that it does not extend to an outer boundary surface of the transparent body. The optically effective structure is preferably smaller in its dimensions than the dimensions of the transparent body. It can also be said that the optically effective structure is only formed in a part of the transparent body. The embedded optically effective structure can have a maximum lateral dimension which is smaller than the maximum lateral dimension of the transparent body. In particular, it can be smaller than 50% of the lateral dimension of the transparent body or also smaller than 40%, 30% or 20% of the lateral dimension of the transparent body. The optically effective structure is thus preferably embedded in the transparent body but only provided in parts.

By carrying out step c) by means of casting, the desired accuracy and reproducibility during the production can also be guaranteed in large quantities.

After step b) and before step c) a protective layer made of duroplastic material can be applied onto the optically effective coating by casting. For this, in particular the RIM process (Rejection Injection Moulding process) can be used. Here, e.g. two components can be mixed immediately before the injection into a mould such that the components react with each other and can form a desired chemically cross-linked polymer. The first transparent partial body is preferably positioned in a corresponding mould such that the desired protective layer can be formed.

The cover layer is preferably formed onto the whole upper side of the first transparent partial body (including the protective layer, if present). The step of forming the cover layer can be carried out, e.g., by means of an injection-moulding process. It is also possible to carry out the step of forming the cover layer by means of an RIM process.

The first partial body can be formed from a first polymer material and in step c), in order to apply the cover layer, a second polymer material can be applied onto the upper side of the first partial body and a chemical bonding of the second polymer material to the first polymer material can be effected.

Since in step c) the chemical bonding of the second polymer material to the first polymer material is effected, step c) can, for example, be carried out at a temperature which is below the softening temperature for the first partial body. The optical element can thus be produced with high quality in large quantities. The step of providing the first transparent body can be carried out, e.g., by means of an injection-moulding process or an injection-compression moulding process. Such processes are characterized by high accuracy.

In particular, the first transparent partial body as well as the cover layer can be formed from the same material and/or by means of the same process.

It is furthermore possible to form the first transparent partial body by means of the RIM process.

The optically effective structure can, for example, be formed as a reflective and/or diffractive structure. In particular, the optically effective structure can be formed as a partially reflective structure and/or wavelength-dependent reflective structure.

The formation of the first partial body and/or the application of the cover layer can, in particular, in each case be carried out in at least two successive partial steps. This leads to reduced shrinkage during the production of the first partial body and/or of the cover layer.

Those materials can be used as first and second polymer material the refractive indices of which differ by not more than 0.005 or 0.001 at least for a wavelength from the predetermined wavelength range. In particular, the refractive indices may differ by not more than 0.0005. With such a small difference in refractive index, the boundary surface between the two polymer materials almost disappears optically for the predetermined wavelength range. In particular, the polymer materials can be chosen such that they have the same dispersion in the predetermined wavelength range.

The predetermined wavelength range can be the visible wavelength range, the near infrared range, the infrared range and/or the UV range.

In order to provide the first partial body according to step a), a moulding process (such as e.g. injection moulding, RIM, casting), a forming process (such as e.g. thermoforming, hot embossing), a removing and/or separating process (such as e.g. diamond turning, ion bombardment, etching) can be used. Of course, it is also possible to combine these processes with each other for providing the first partial body. In particular, the first partial body can also be formed in several parts, wherein the processes indicated can be used for each part of the first partial body. Furthermore, known structuring processes can be used for the structured section. The named processes for providing the first partial body can also be used for the structuring.

The application of the optically active coating according to step b) can, for example, be carried out by vapour deposition, sputtering, CVD (chemical vapour deposition), wet coating, etc. The coating can be a single layer. However, it is also possible to apply several layers. In particular, an interference layer system can also be applied. Furthermore, at least one layer for adhesion, one layer for mechanical compensation and a protective layer (diffusion/migration, thermal protection, chemical protection, UV protection etc.) can additionally be applied. The optically effective coating can be designed for specific wavelengths or spectral ranges. Furthermore, the function thereof can additionally or alternatively be dependent on the angle of incidence, on the polarization and/or on further optical properties. The optically effective structure can be reflective, in particular highly reflective (e.g. mirror-like), partially transparent/partially reflecting and/or can provide a filter effect. Furthermore, the optically effective coating can be a diffractive optical element.

In addition, the optically effective coating can be a separating layer which prevents a chemical bonding of the second polymer material to the first polymer material in the area of the optically effective structure and causes local demoulding, which leads to an air gap. In this case, total internal reflection can, e.g., occur as a result of the transition from the polymer material to the air gap.

The optically effective coating may be applied only onto the structured section. Alternatively it is possible to apply the optically effective coating over the whole surface and then to remove it in the surface sections which are not required. Chemical etching or ion etching can be used, e.g., for such a removal.

At least one metal, at least one metal oxide or at least one metal nitride can be used for the optically effective coating. An organic material and/or a polymer material can also be used. Furthermore, so-called hybrid materials, such as e.g. organic-inorganic hybrid systems or organically modified silanes/polysiloxanes can be used. A chemically inert or surface-active substance can be used as separating layer. Examples thereof are e.g. fatty acid derivatives, phosphates and fluorinated silanes.

Reactive resins or reactive systems can, for example, be used as second polymer material. In particular, conventionally known reactive systems can be used, as are known from the production of spectacle lenses. For example, ADC (allyl diglycol carbonate, e.g. CR-39), acrylates (e.g. Spectralite), PUR (polyurethanes, e.g. RAVolution), thiol-ene systems (e.g. Finalite), PU/PUR (polyureas, polyurethanes, e.g. Trivex), PTU (polythiourethanes, e.g. MR-8, MR-7) and/or polymers on episulfide/polythiol basis (e.g. MR-74) can be used. Epoxides can also be used.

Steps a)-c) can be carried out such that the optically effective structure is completely embedded in the transparent body. The optically effective structure thus does not extend to a material boundary surface of the transparent body.

Furthermore, steps a)-c) can be performed such that the optically effective structure comprises surface pieces spaced apart from each other which provide the desired optical function. The surface pieces can, for example, be reflective surface pieces. The reflective surface pieces can bring about a complete reflection (almost 100%) or also only a partial reflection (partially reflective surface pieces). In particular, the reflective surface pieces do not lie in a common plane. They can be offset parallel to each other.

Together, the reflective surface pieces can provide a deflecting effect and, optionally, they can additionally also provide an imaging effect.

The surface pieces can in each case be formed separately as flat surface pieces or also as surface pieces formed curved.

The optical element can be finished after carrying out step c). However, it is also possible to carry out at least one more material-removing processing step in order, for example, to machine or carve out the boundary surface of the cover layer facing away from the first partial body. The same applies for the boundary surface of the first partial body facing away from the cover layer.

Of course, at least one more surface-finishing method step can be carried out, such as e.g. the application of an anti-reflection coating, a hard coating, etc. In particular, the finishing processes known from the manufacture of spectacle lenses can be carried out.

The finished optical element can thus be provided using the method disclosed herein. However, it is also possible for yet more method steps to be necessary in order to finish the optical element such that it can be used for its intended use.

Furthermore, an optical element with a transparent body, in which an optically effective structure is embedded, is provided wherein the optical element is produced by the steps of the method disclosed herein (including further developments thereof).

In particular, the optical element can be formed as a spectacle lens for a display device that can be fitted on the head of a user and generates an image as well as comprise a front side and a rear side, a coupling-in section and a coupling-out section spaced apart from the coupling-in section and a light guiding channel which guides light bundles of pixels of the generated image, which are coupled into the optical element via the coupling-in section of the optical element, in the optical element to the coupling-out section, by which they are coupled out of the spectacle lens, wherein the coupling-out section comprises the optically effective structure, which brings about a deflection of the light bundles to the coupling-out.

Furthermore, a display device with a holder that can be fitted on the head of a user, an image-generating module secured to the holder, which generates an image, and an imaging optical system secured to the holder, which comprises an optical element according to the invention and which, when the holder is fitted on the user's head, images the generated image such that the user can perceive it as a virtual image, is provided.

The imaging optical system can comprise the optical element as the only optical element. However, it is also possible for the imaging optical system to comprise, in addition to the optical element, at least one further optical element.

The display device can comprise a control unit which controls the image-generating module.

The image-generating module can in particular comprise a two-dimensional imaging system, such as e.g. an LCD module, an LCoS module, an OLED module or a tilting mirror matrix. The imaging system can comprise a plurality of pixels, which can be arranged e.g. in rows and columns. The imaging system can be self-luminous or not self-luminous.

The image-generating module can in particular be formed such that it generates a monochromatic or a multiple image.

The display device can comprise further elements known to a person skilled in the art which are necessary for its operation.

It is understood that the features mentioned above and those yet to be explained below can be used not only in the stated combinations but also in other combinations or alone, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 1:
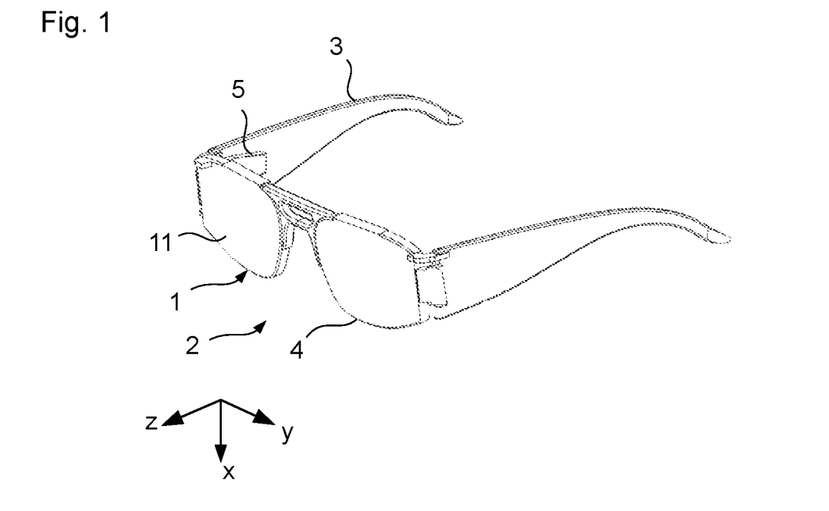
FIG. 1 is an example embodiment of the display device according to certain embodiments.

In the embodiment shown in FIG. 1, the optical element 1 according to the invention is formed as a spectacle lens (here right-hand spectacle lens) of a display device 2 that can be fitted on the head of a user.

The display device 2 comprises a holder 3 that can be fitted on the head of the user and can be formed e.g. in the manner of a conventional spectacles frame, as well as the optical element 1 according to the invention as right-hand spectacle lens and a second spectacle lens 4, which are secured to the holder 3. The holder 3 with the spectacle lenses 1 and 4 can be formed e.g. as sports glasses, sunglasses and/or glasses for correcting defective vision, wherein a virtual image can be reflected into the user's field of view via the optical element 1, as described below.

For this purpose, the display device 2 comprises an image-generating module 5 which can be arranged in the area of the right-hand temple stem of the holder 3, as is represented schematically in FIG. 1. The image-generating module 5 can comprise a two-dimensional image-generating element 6, such as e.g. an OLED, LCD or LCoS chip or a tilting mirror matrix, with a plurality of pixels arranged e.g. in columns and rows.

The spectacle lenses 1 and 4, and in particular the first spectacle lens 1, are only described together with the display device 1 according to the invention by way of example. The spectacle lenses 1, 4, or at least the first spectacle lens 1, are in each case formed separately as a spectacle lens 1, 4 according to the invention or as an optical element according to the invention. The optical element according to the invention can also be used in a context other than with the display device 2 described here. Furthermore, the optical element 1, when it is formed as a spectacle lens, can, of course, also be formed as a second spectacle lens 4.

Figure 2:
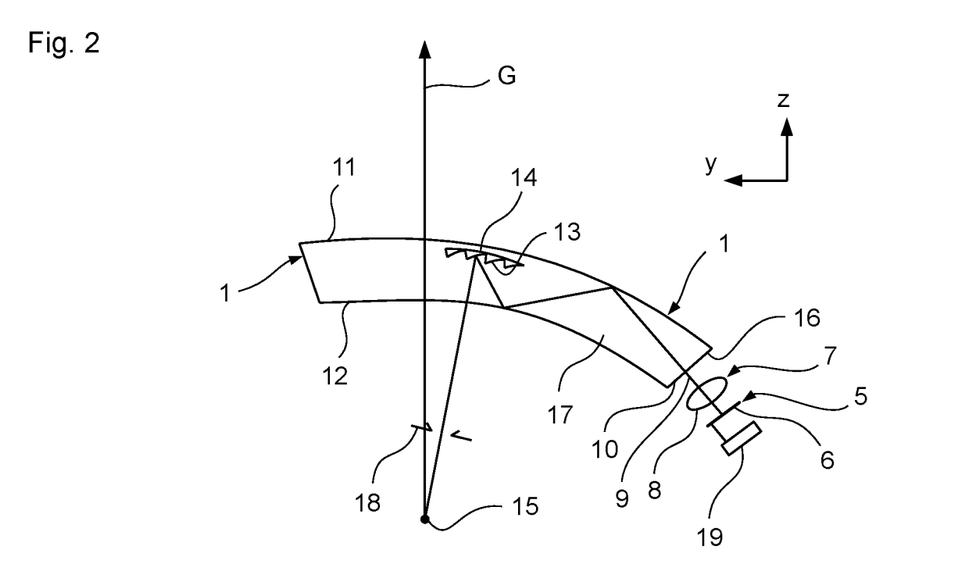
FIG. 2 is an enlarged partial sectional view of the optical element according to the invention including a schematic representation of the image-generating module.

As can best be seen from the enlarged partial sectional view in FIG. 2, the display device 2 comprises an imaging optical system 7 which contains a lens 8 arranged between the image-generating element 6, or the imaging system 6, and the first spectacle lens 1. In addition, the first spectacle lens 1 itself also serves as part of the imaging optical system 7.

A light bundle 9 can emerge from each pixel of the imaging system 6. The desired image can be generated by correspondingly controlling the pixels of the imaging system 6 by means of a control unit 19, which can be part of the image-generating module 5. In FIG. 2, the beam path of a light beam is drawn in to represent the light bundles 9, with the result that the light beam 9 is also discussed below.

The light beam 9 emerging from the imaging system 6 runs through the lens 8 and enters the first spectacle lens 1 via an end face 10 of the first spectacle lens 1. The light beam 9 then strikes a front side 11 of the first spectacle lens 1, wherein the angle of incidence is predetermined such that a total internal reflection occurs. After another total internal reflection on a rear side 12 of the first spectacle lens 1, the light beam 9 strikes one of several reflective deflecting surfaces 13 of a coupling-out section 14 of the first spectacle lens 1, and is reflected to the rear side 12 by the reflective deflecting surface 13 such that the light beam exits the first spectacle lens 1 via the rear side 12.

Thus, when a user is wearing the display device 2 according to the invention on his head as intended, he can perceive the image generated by means of the imaging system 6 as a virtual image when he looks at the coupling-out section 14. In the embodiment described here, the user must look slightly to the right relative to the direction of view G of a forward view. In FIG. 2, the centre of rotation 15, the user's eye, as well as the eyebox 18 or the exit pupil 18 of the imaging optical system 7, are drawn in for clarification. The eyebox 18 is the area which is provided by the display device 2 and in which the user's eye can move and he can still always see the generated image as a virtual image.

The section of the first spectacle lens 1 via which the light beam 9 is coupled into the spectacle lens 1 can be referred to as coupling-in section 16. Although a coupling-in via the end face 10 is described in the described embodiment, it is also possible to carry out a coupling-in via the rear side 12 of the first spectacle lens 1.

The areas of the front and rear side 11, 12 of the first spectacle lens 1 in which the light beam 9 is guided by means of total internal reflection from the coupling-in section 16 to the coupling-out section 14 form a light guiding channel 17 in which the light bundles 9 are guided from the coupling-in section 16 to the coupling-out section 14.

In the representation in FIG. 2, only one total internal reflection is represented on the front side 11 and on the rear side 12. However, this is to be understood as a purely schematic representation. Naturally, several total internal reflections can occur. Furthermore, it is also possible to provide the front and/or rear side in the area of the light guiding channel 17 with a reflective or partially reflective coating, with the result that the light guiding in the light guiding channel 17 is brought about by means of conventional reflection on the corresponding reflecting surface. It is furthermore possible to arrange one or two reflective layers in the first spectacle lens 1 which are spaced apart in each case from the front side 11 and the rear side 12 and serve to guide the light, and thus form the light guiding channel 17 (at least partially).

Figure 3:
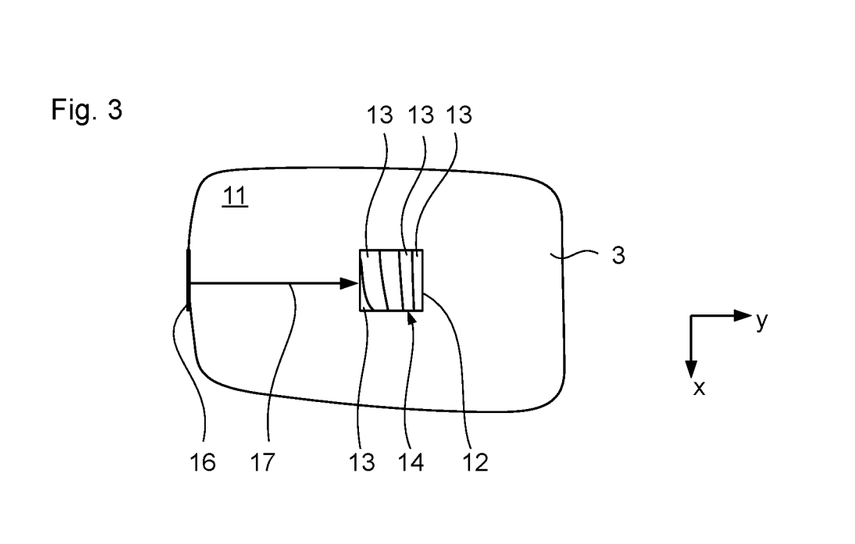
FIG. 3 is a schematically enlarged view of the rear side of the optical element in the area of the light guiding channel and of the coupling-out section.

In the view of the front side 11 shown in FIG. 3, the coupling-in section 16, the light guiding channel 17, as well as the coupling-out section 14 with the reflective deflecting surfaces 13 (or reflective facets 13) are represented schematically.

A method for producing the optical element 1 according to the invention is described below.

Figure 4:
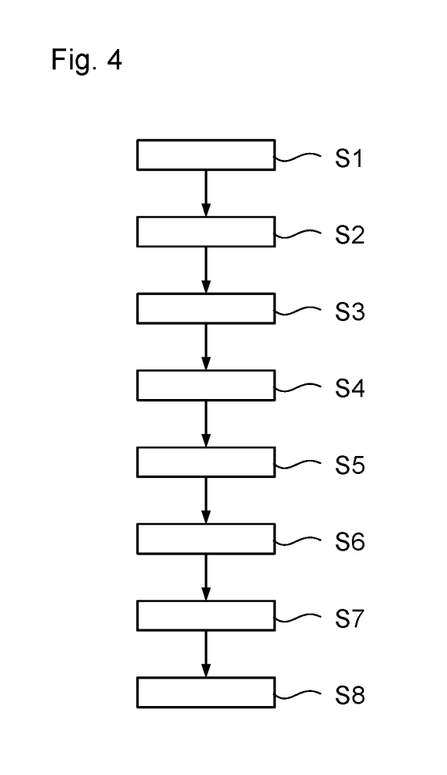
FIG. 4 is a flow diagram to describe a method for producing the optical element according to certain embodiments.
Figure 5:
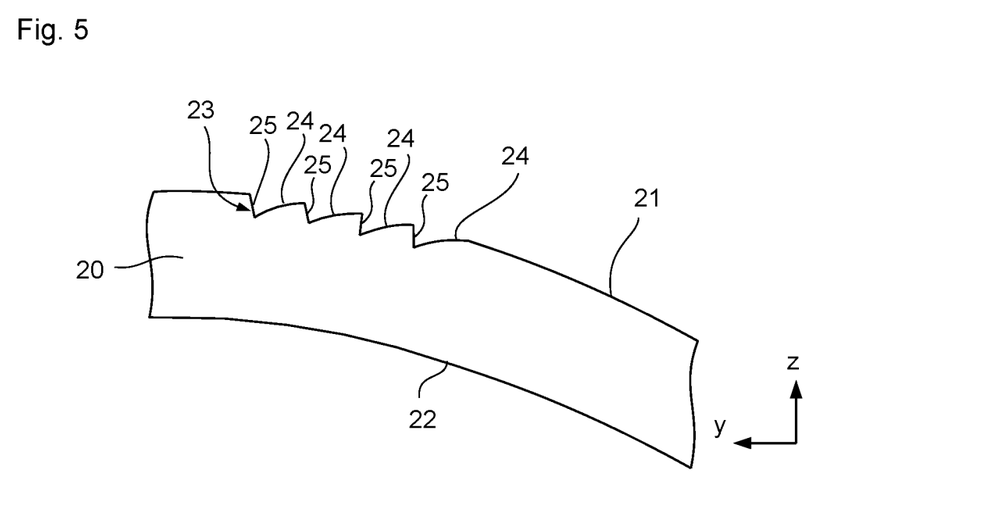
FIG. 5 is an enlarged sectional view of the first transparent partial body to explain the production of the optical element according to certain embodiments.

In a first step S1 (FIG. 4), a first partial body 20 which is transparent for a predetermined wavelength range and is shown in FIG. 5 is produced from a thermoplastic material by means of injection moulding. The first partial body 20 comprises a front boundary surface 21 and a rear boundary surface 22. The rear boundary surface 22 can, for example, form the rear side 12 in the finished optical element 1. Here, the predetermined wavelength range is the visible wavelength range, which extends from approximately 380 nm to 780 nm.

On the front boundary surface 21, the first transparent partial body 20 comprises a structuring 23 which can be seen clearly in the enlarged sectional view of a part of the first transparent partial body 20 shown in FIG. 4. The structuring is a zigzag structure with principal edges 24 formed curved which are in each case connected to lateral edges 25. Here, the principal edges 24 are represented curved. However, they can also be formed flat. The first transparent partial body 20 shown in FIG. 4 can also be referred to as an intermediate injection-moulded part.

The first transparent partial body 20 according to FIG. 4 can, if necessary and/or desired, be cleaned in step S2 and activated for a subsequent coating step S3. The activation can be limited to the principal edges 24 to be coated. For the cleaning and activation, the first partial body 20 can be placed in an ultrasonic bath. The activation can be carried out e.g. under basic conditions or by means of glow discharge. For the activation, a thin lacquer layer can furthermore be applied with a thickness in the range from 2 to 10 µm. An SeO$_2$ coating can also be applied with a thickness of less than 10 nm. This can be carried out, for example, by means of plasma, CVD (chemical vapour deposition) or PVD (physical vapour deposition).

Figure 6:
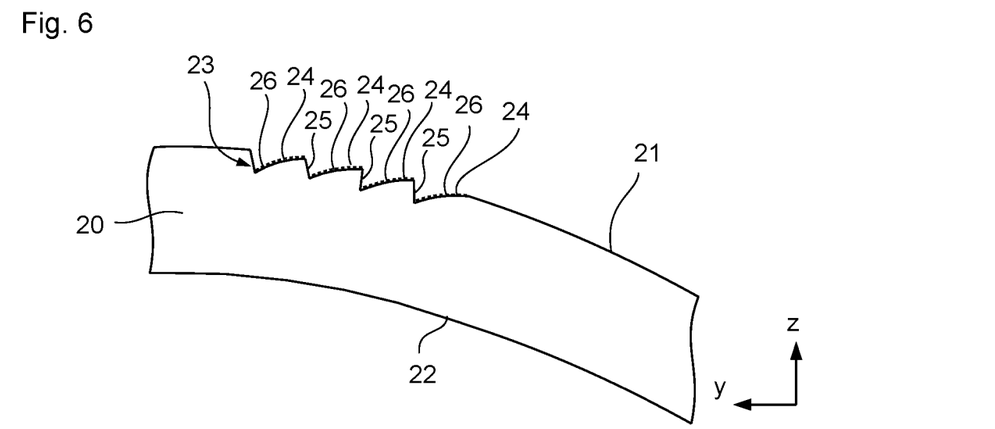
FIG. 6 is a sectional view of the first transparent partial body with applied reflective coating.

In the coating step S3, only the structuring 23 (and here only the principal edges 24) is provided with a reflective coating 26 (FIG. 6). This can be carried out, for example, by corresponding masking of the front boundary surface 21 and subsequent sputtering, varnishing or application of a lacquer layer and/or vapour deposition (e.g. by chemical vapour deposition or physical vapour deposition).

After step S3, a cleaning and activation step can be carried out as step S4. Step S4 can be identical or similar to step S2.

Figure 7:
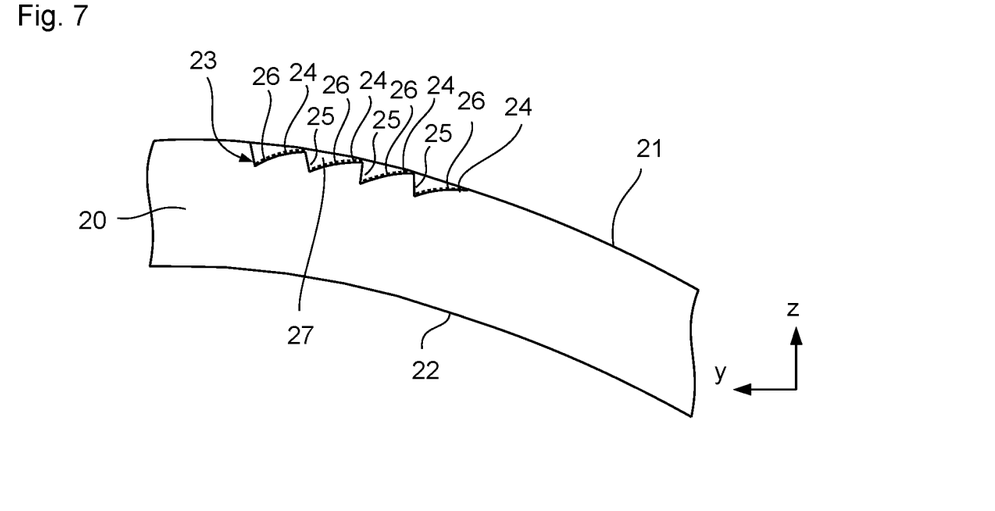
FIG. 7 is a sectional view of the first transparent partial body with applied protective layer.

Next, the structuring 23, and in particular the reflective coating 26, is covered with a protective layer 27 in step S5 (FIG. 7). For this, a chemically cross-linking polymer is applied, which if possible has the same optical properties as the material for the first transparent partial body 20. The application of the chemically cross-linking polymer is preferably carried out by a so-called RIM process (Reaction Injection Moulding process). In this process, two components such as e.g. polyol and isocyanate are mixed with each other and then injected under pressure into a mould in which the first transparent partial body 20 is positioned such that the desired formation of the protective layer 27 takes place. The two components react with each other in such a way that the desired chemically cross-linked polymer (here e.g. polyurethane) is formed.

Here, the advantage of the use of the RIM process lies in the fact that the required pressure is considerably lower in comparison with the conventional injection moulding of thermoplastic materials, whereby it can be ensured that the structuring 23 with the reflective coating 26 is not damaged during the application of the protective layer 27.

Figure 8:
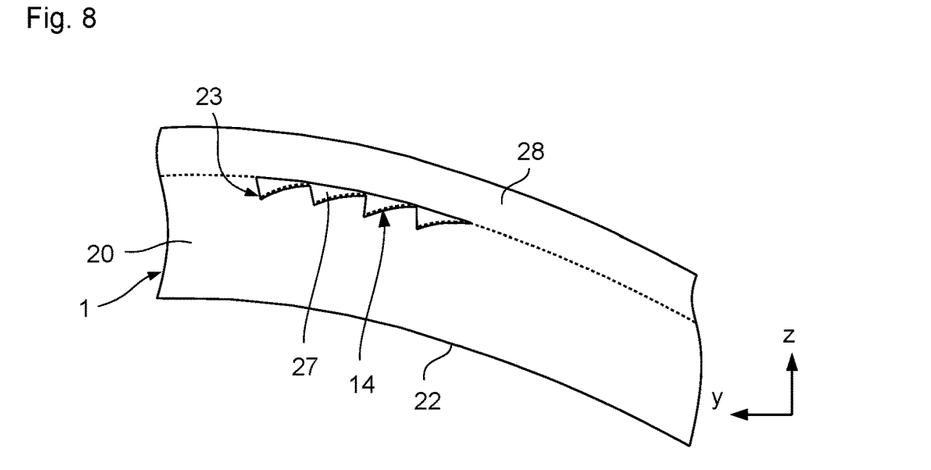
FIG. 8 is a sectional view of the finished optical element according to certain embodiments.

After application of the protective layer 27, a further injection-moulding step S6 (which can also be referred to as overmoulding) is carried out with the same material as for the first transparent partial body in order to apply a finishing or cover layer 28 and thus to finish the optical element (FIG. 8). The finishing layer 28 can also be referred to as a cover layer 28. In FIG. 8, a dashed separating line is drawn in between the finishing layer 28 and the first transparent partial body 20 in order to distinguish the two elements 28 and 20. Such a separating line is not actually present.

Through the method steps described, it is in particular achieved that the optical element 1, in addition to the structuring 23, is constructed homogeneously from one material and has identical or virtually identical properties (in particular mechanical, optical, chemical and/or physical properties), since the same material is used in the injection moulding of the first transparent partial body 20 and in the application of the finishing layer 28 in order to finish the optical element 1.

The materials for the first transparent partial body 20 and the finishing or cover layer 28 are preferably chosen such that the refractive indices of the two materials differ by not more than 0.001 and in particular by not more than 0.0005 at least for a wavelength from the predetermined wavelength range. In particular, the materials are chosen such that the dispersion in the predetermined wavelength range is the same or differs only slightly from each other to the extent that this does not result in an adverse optical effect during the use of the optical element 1 according to the invention as intended.

After step S6, an annealing in order to relieve stresses can optionally be carried out as step S7.

Furthermore, a finishing of the front side 11 formed by the material boundary surface of the cover layer 28 facing away from the first partial body 20 can in addition optionally be carried out as step S8. For this, a hard coating (polysiloxane), an anti-reflection layer or other layers can for example be applied.

Using the procedure described, it is possible to place the coupling-out section 14 freely within the volume of the finished optical element 1 according to the invention and thus also to protect against external environmental influences.

Figure 9:
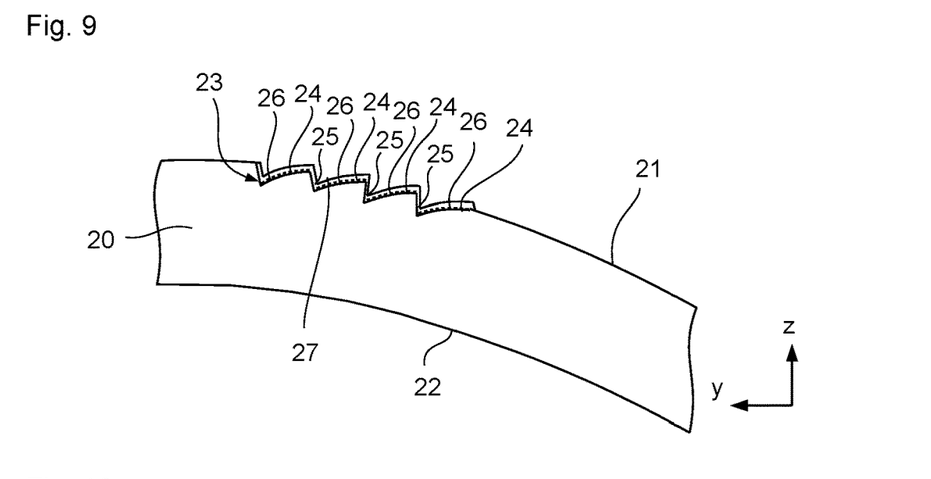
FIG. 9 is a sectional view of the first transparent partial body to explain a modification of the step of applying the protective layer.
Figure 10:
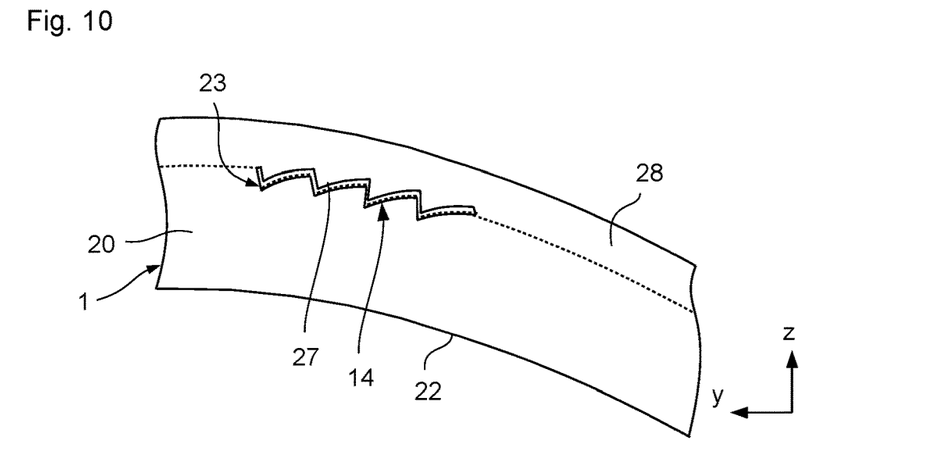
FIG. 10 is a sectional view of the finished optical element according to certain embodiments with a protective layer according to FIG. 9.

FIG. 9 shows a modification of step S5 according to FIG. 7. In this modification, the RIM process is carried out such that the recesses formed by the principal and lateral edges 24, 25 are not filled completely. The corresponding finished optical element is represented in FIG. 10. Here too, a dashed separating line which, however, is not actually present is drawn in in the same way as in FIG. 8.

Figure 11:
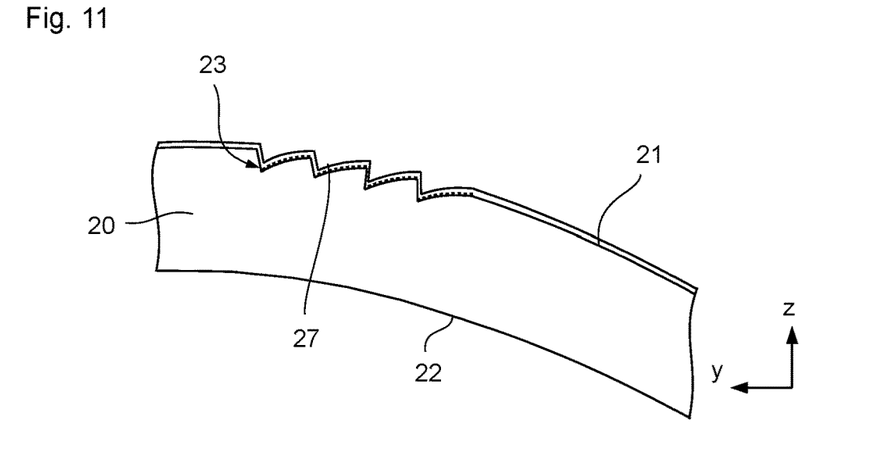
FIG. 11 is a sectional view to explain a further embodiment for the application of the protective layer.
Figure 12:
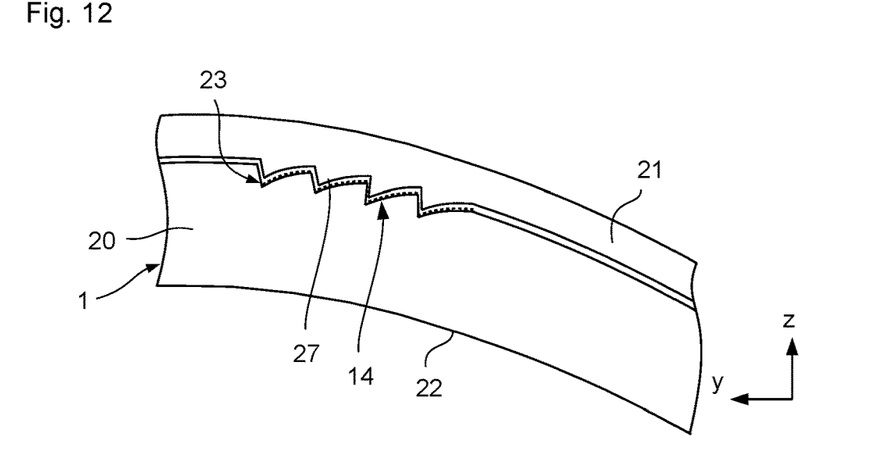
FIG. 12 is a sectional view of the optical element according to certain embodiments with a protective layer according to FIG. 11.

FIG. 11 shows a modification of step S5 according to FIG. 7 in which the coating by means of the RIM process is carried out such that the entire front boundary surface 21 is coated. The thermoplastic material is then applied thereto in step S6 in order to finish the optical element 1 according to the invention, as is indicated in FIG. 12.

Figure 13:
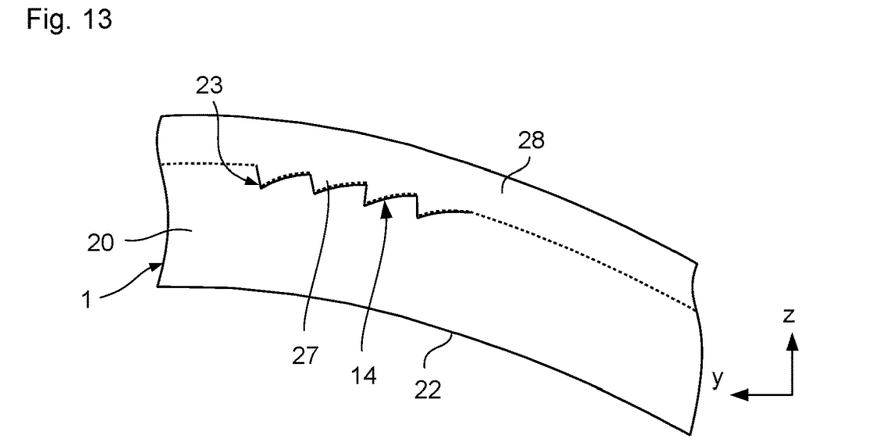
FIG. 13 is a sectional view of a modification of the optical element according to certain embodiments.

In a further modification, the RIM step S7 can be carried out after step S3 according to FIG. 6 or after step S4 such that, by means of this step, the finishing layer 28 is formed which also simultaneously fills the structuring 23 and in particular covers the reflective coating 26. The finished optical element 1 is shown schematically in FIG. 13. The separating line between the first transparent partial body 20 and the finishing layer 28 is only intended to illustrate that the two layers were produced successively. Since the finishing layer 28 is produced by means of the RIM process, a chemical bonding of the material takes place, with the result that no visible separating layer is present. The separating layer drawn in only serves to illustrate the method steps carried out.

In a modification of the processes described in conjunction with FIGS. 4 to 13, the first transparent partial body 20 cannot be formed by injection moulding, but rather by compression moulding or press forming. It is furthermore possible to produce the first transparent partial body 20 by means of the RIM process.

In all of the process steps, the layers described can be formed in one or in several steps. The first transparent partial body 20 can thus be formed in two or more steps. The same applies for the finishing layer 28. This is advantageous in particular with regard to the unavoidable shrinkage during the production of the layers, since the shrinkage is volume-dependent. If the layer is formed from several sublayers, the overall shrinkage is less when compared with the formation of the layer as a whole in one step. The formation of the first transparent partial body 20 and/or of the finishing layer 28 from several sublayers in two or more successive steps is advantageous, in particular when using the RIM process, since the latter can as a rule involve a relatively large volume shrinkage which can absolutely be in the range from 5 to 15%.

In the RIM process, the cross-linking of the polymer can be induced not only by mixing two components, but also for example thermally and/or by exposure to UV.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A method for producing an optical element which comprises a body that is transparent for a predetermined wavelength range, in which an optically effective structure is embedded, the method comprising:
   a) providing a first partial body which is transparent for the predetermined wavelength range, the first partial body including a structured section on an upper side thereof;
   b) applying a coating which is optically effective for the predetermined wavelength range onto the structured section in order to form the optically effective structure; and
   c) applying a cover layer which is transparent for the predetermined wavelength range onto the upper side of the first partial body via casting of at least one of a thermoplastic material and a duroplastic material.

2. The method of claim 1, wherein after step b) and before step c), a protective Layer comprising a duroplastic material is applied to the optically effective coating by casting.

3. The method of claim 2, in which in step c) the cover layer is formed on the whole upper side of the first partial body including the protective layer.

4. The method of claim 1, wherein the first partial body is formed from a first polymer material, and in step c), for application of the cover layer, a second polymer material different from the first polymer material is applied onto the upper side of the first partial body and a chemical bonding of the second polymer material to the first polymer material is effected.

5. The method of claim 4, wherein the first and second polymer materials have respective first and second refractive indices which differ by not more than 0.005 at least for a wavelength from the predetermined wavelength range.

6. The method of claim 1, wherein in step c) the thermoplastic material is applied via an injection-molding process.

7. The method of claim 1, wherein in step c) the duroplastic material is applied via an RIM process.

8. The method of claim 7, wherein the application of the duroplastic material is carried out via the RIM process in at least two successive partial steps.

9. The method of claim 1, wherein in step a), for provision of the first partial body, the latter is formed from duroplastic material via an RIM process.

10. The method of claim 9, wherein the application of the duroplastic material is carried out via the RIM process in at least two successive partial steps.

11. The method of claim 1, wherein the cover layer in step c) is formed such that a boundary surface of the cover layer facing away from the first partial body forms a boundary surface of the optical element.

12. The method of claim 1, wherein steps a)-c) are carried out such that the optically effective structure is completely embedded in the transparent body.

13. The method of claim 1, wherein steps a)-c) are performed such that the optically effective structure comprises reflective surface portions spaced apart from each other.

14. An optical element comprising a transparent body that includes an optically effective structure embedded therein that is produced by the steps of claim 1.

15. The optical element according to claim 14, which is configured as a spectacle lens for a display device that can be fitted on the head of a user and which generates an image, the optical element further comprising:

a front side and a rear side;

a coupling-in section and a coupling-out section spaced apart from the coupling-in section; and a light guiding channel which is configured to guide light bundles of pixels of the generated image, which are coupled into the optical element via the coupling-in section of the optical element, in the optical element to the coupling-out section, by which they are coupled out of the optical element, wherein the coupling-out section comprises the optically effective structure, which brings about a deflection of the light bundles to the coupling-out.

16. A display device, comprising:

a holder configured to be fitted on the head of a user;

an image-generating module secured to the holder, which generates an image; and an imaging optical system secured to the holder, which comprises an optical element according to claim 15 and which, when the holder is fitted on the user's head, images the generated image such that the user can perceive it as a virtual image.

* * * * *